I. I. McLEOD.
WHEEL TIRE.
APPLICATION FILED OCT. 11, 1916.

1,219,653.

Patented Mar. 20, 1917.

WITNESSES
W. C. Fielding

INVENTOR
Ida I. McLeod
BY Richard B. Owen.
ATTORNEY

UNITED STATES PATENT OFFICE.

IDA I. McLEOD, OF LAKELAND, FLORIDA.

WHEEL-TIRE.

1,219,653.　　　　　Specification of Letters Patent.　　Patented Mar. 20, 1917.

Application filed October 11, 1916. Serial No. 125,071.

*To all whom it may concern:*

Be it known that I, IDA I. MCLEOD, a citizen of the United States, residing at Lakeland, in the county of Polk and State of Florida, have invented certain new and useful Improvements in Wheel-Tires, of which the following is a specification.

This invention relates to tires, and particularly to resilient tires for use upon vehicle wheels.

The invention aims primarily to provide a resilient tire which obviates the use of the now generally employed pneumatic tires, but which shall embody all of the advantageous features of such tires. The invention aims further to provide a tire of this character which involves the use of a casing having arranged therein, a plurality of resilient members constituting cushioning elements, and wherein the said elements are arranged and assembled in such manner as to efficiently absorb shocks and jars to which the tire will be subjected as the wheel travels over rough or uneven ground, without danger of the various elements becoming deranged, broken or distorted. Still further objects reside in the provision of a device of this character which is of extremely simple construction, which is composed of but few simple and readily assembled parts, which may be manufactured at comparatively low cost and which will require no attention after once being applied to the rim of a wheel, which has its cushioning elements so arranged as to coöperate with each other in absorbing shocks, which may be readily attached to and detached from a wheel rim, and which will prove thoroughly efficient in the attainment of the ends set forth.

With these objects in view, together with others which will appear as the description proceeds, the invention resides in the novel formation, combination and arrangement of parts, all as will be described more fully hereinafter, illustrated in the drawings, and particularly pointed out in the claims.

In the drawings:—

Figure 1:
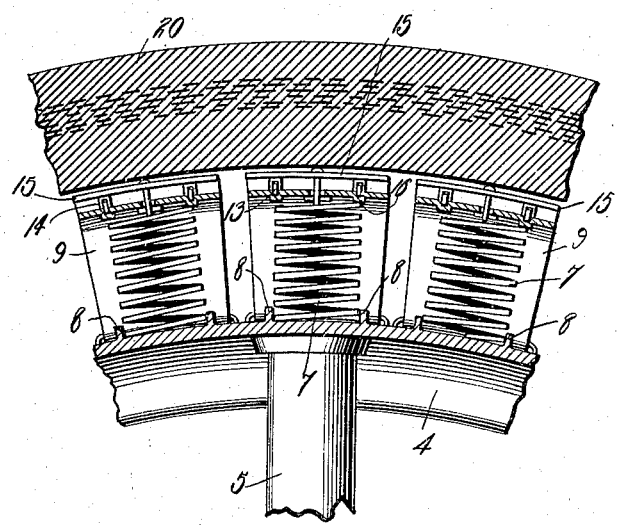
Figure 1 is a longitudinal sectional view taken through a wheel rim equipped with a cushioning tire constructed in accordance with my invention.
Figure 3:
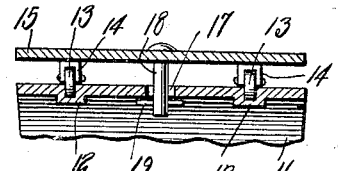
Fig. 3 is a sectional view taken upon line 3—3 of Fig. 2.
Figure 2:
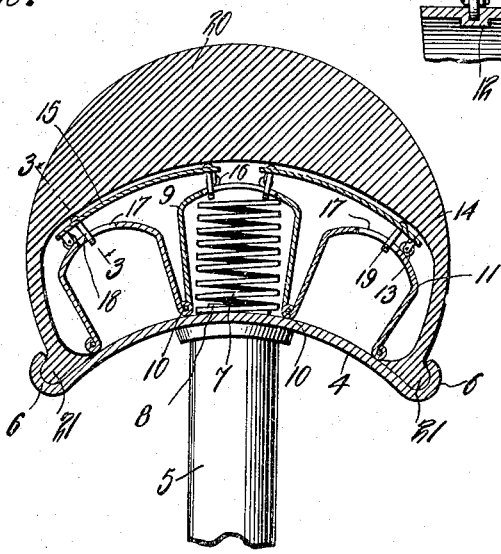
Fig. 2 is a transverse sectional view taken through the tire and rim.

Referring now more particularly to the drawings, 4 represents a wheel rim or felly, the latter being connected to the hub by spokes indicated at 5. The rim in the present instance is of special construction and is formed of metal, being convexed laterally as shown. The edges of the rim are turned up into hook form as indicated at 6 so as to provide means for securing the edges of the tire casing to be hereafter detailed.

Arranged upon the rim 4, intermediate the lateral edges of the same and in spaced relation to each other throughout the circumference of the rim are coil springs 7. These springs project radially from the rim and are held against circumferential shifting movement by upwardly extending lugs or confining members 8 upon the rim. Extending outwardly beyond each of the springs 7 and inclosing the same are bow springs 9, the latter being inverted and resting at their edges upon the rim. Hingedly connected as at 10 to the opposite edges of each of the bow springs 9, is one end of a spring metal shock absorbing member in the form of an inverted U-shaped spring 11. These springs have their rim engaging edges rounded as shown, so as to play over the smooth outer face of the rim as the wheel is subjected to pressure or contacts the ground. The springs 11 are disposed laterally of the rim as shown, and are adapted to expand or spread as the tire is subjected to pressure.

The outer faces of the members 11 are provided with spaced parallel depressed portions 12, which form laterally extending trackways in the said springs to receive rollers 13 mounted in bearings 14 depending from the outer end of a plate 15 connecting each of the outer springs 11 with the adjacent spring 9. These plates are of arcuate formation throughout their length, and are substantially concentric with the laterally arched felly or rim 4. Rollers 16 also depend from the innermost ends of the plates 15, and rest upon the outer surfaces of the springs 9. The outer springs 11, as well as the centrally arranged springs 9 are provided with laterally disposed slots 17, through which pins 18 depending from the adjacent ends of the plates 15 extend. Cross pins or tie members 19 are extended through the lowermost ends of the pins 18 to prevent the same becoming disengaged from the bow springs to which they are connected. These elongated slots permit of movement of the plates laterally of the vehicle tire, and the resiliency of the plates assist in absorbing shocks delivered to the tire.

A casing 20 of hard rubber or other composition incloses the shock absorbing elements above detailed, and is provided at its edges with beads 21 for engagement in the hooked edges 6 of the rim to secure the casing to the latter.

From the foregoing, it is apparent that I have provided an extremely simple and thoroughly efficient means for absorbing shocks without the use of pneumatic tires. The cushioning elements are so assembled within the casing as to be entirely independent of the latter and yet are maintained in proper position upon the rim to yield to jars delivered to the casing. The particular arrangement prevents displacement of the various elements, whereby the length of the life of the said elements, as well as the tire, will be increased.

While the present disclosure is that of the preferred embodiment of the invention, it is obvious that various changes in the minor details of construction and arrangement of parts may be resorted to, if desired, without departing from the spirit of the invention or exceeding the scope of the claims, and the right to make such variation in construction is hereby reserved.

What is claimed is:—

1. In a cushion tire for wheels, bow springs arranged upon the rim of the wheel in inverted order, plates spanning said bow springs and extending from one to the other, rollers on said plates for engagement with said bow springs, and a casing inclosing said bow springs and plates.

2. In a cushion tire for wheels, bow springs arranged in inverted order upon the rim of said wheel and each having a laterally disposed slot, plates spanning said springs and resting upon the latter, pins projecting from said plates into said slots, and a casing inclosing said springs and plates.

3. In a cushion tire for wheels, bow springs arranged in transverse series and in inverted order upon the rim of said wheel, coil springs within certain of said bow springs, and a casing secured to said rim and inclosing said bow springs.

4. In a cushion tire for wheels, bow springs of substantially U-shape arranged in inverted order upon the rim of said wheel, the adjacent ends of said springs being connected, each spring being provided with laterally disposed spaced parallel grooves, plates spanning said springs, rollers on said plates engaging in said grooves, and a casing inclosing said springs and plates.

5. In a cushion tire for wheels, the combination with a laterally concaved rim, of bow springs bent into U-shape and arranged in inverted order upon said rim in laterally disposed series, the adjacent ends of said springs being hinged together, plates spanning the space between the adjacent springs, rollers on said plates, tracks on said springs to receive said rollers, each spring having a laterally disposed slot, pins projecting from said plates through said slots, locking pins extending laterally through the extremities of said first named pins, and a casing inclosing said springs and plates.

6. In a cushion tire for wheels, spring metal members bent into substantially U-shape and arranged in inverted position upon the rim of the wheel, plates extending between said members and resting at their ends upon the bight portions of said members, means for preventing said plates moving laterally of said members, and rollers on the ends of said plates and engaging said members.

In testimony whereof I affix my signature in presence of two witnesses.

IDA I. McLEOD.

Witnesses:
MAUDE D. POOLER,
EDWIN SPENCER, Jr.